United States Patent
Komatsubara et al.

(10) Patent No.: US 8,189,853 B2
(45) Date of Patent: May 29, 2012

(54) WATERMARKED IMAGE GENERATION APPARATUS, WATERMARKED IMAGE ANALYSIS APPARATUS, WATERMARKED IMAGE GENERATION METHOD, MEDIUM AND COMPUTER READABLE MEDIUM

(75) Inventors: Hirofumi Komatsubara, Kanagawa (JP); Katsuyki Kouno, Kanagawa (JP); Kenji Ebitani, Kanagawa (JP); Fujio Ihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 923 days.

(21) Appl. No.: 11/525,153

(22) Filed: Sep. 22, 2006

(65) Prior Publication Data

US 2007/0172096 A1 Jul. 26, 2007

(30) Foreign Application Priority Data

Jan. 24, 2006 (JP) ................. 2006-015425

(51) Int. Cl.
 G06K 9/00 (2006.01)
 G06K 9/36 (2006.01)
 H04L 9/32 (2006.01)
 H04N 1/40 (2006.01)
(52) U.S. Cl. ........ 382/100; 382/232; 358/3.28; 713/176
(58) Field of Classification Search .................. 382/100, 382/232; 713/176; 358/3.28
See application file for complete search history.

(56) References Cited

U.S. PATENT DOCUMENTS

2001/0030759 A1* 10/2001 Hayashi et al. ................. 358/1.9
2003/0210784 A1* 11/2003 Noridomi et al. ............. 380/202
2004/0264793 A1* 12/2004 Okubo .......................... 382/243

FOREIGN PATENT DOCUMENTS

| JP | 10-303864 | * 11/1998 |
| JP | A-11-122470 | 4/1999 |
| JP | A-2004-147253 | 5/2004 |
| JP | 2005-026797 | * 1/2005 |
| JP | A 2005-26797 | 1/2005 |
| JP | A-2005-318201 | 11/2005 |

OTHER PUBLICATIONS

Aug. 17, 2010 Office Action issued in Japanese Patent Application No. 2006-015425 (with translation).

* cited by examiner

*Primary Examiner* — Vu Le
*Assistant Examiner* — Amara Abdi
(74) *Attorney, Agent, or Firm* — Oliff & Berridge, PLC (57) ABSTRACT

A watermarked image generation apparatus embeds target data in an original image to generate a watermarked image. The watermarked image generation apparatus includes a target-data embedding unit and a marker-image embedding unit. The target-data embedding unit embeds the target data in respective plural embedding areas contained in the original image, to generate a watermarked image. The marker-image embedding unit embeds in the watermarked image a plurality of marker images used for identifying the plurality of embedding areas.

9 Claims, 5 Drawing Sheets

WATERMARKED IMAGE GENERATION APPARATUS, WATERMARKED IMAGE ANALYSIS APPARATUS, WATERMARKED IMAGE GENERATION METHOD, MEDIUM AND COMPUTER READABLE MEDIUM

BACKGROUND

1. Technical Field

This invention relates to a watermarked image generation apparatus, a watermarked image generation method, and a computer readable medium for embedding target data in an original image to generate a watermarked image, a medium formed with a watermarked image, and a watermarked image analysis apparatus for analyzing a watermarked image and extracting target data.

2. Description of the Related Art

In recent years, to prevent tampering with an image formed on a medium (e.g., a sheet of paper), a technique for embedding target data in an original image (electronic watermarking technology) has been known. The electronic watermarking technology embeds target data in an original image by various methods in a form non-recognizable to a human being at a glance, to generate a watermarked image.

The watermarked image thus generated may be formed on a medium (e.g. a sheet of paper).

SUMMARY

According to an aspect of the invention, a watermarked image generation apparatus embeds target data in an original image to generate a watermarked image. The watermarked image generation apparatus includes a target-data embedding unit and a marker-image embedding unit. The target-data embedding unit embeds the target data in respective plural embedding areas contained in the original image, to generate a watermarked image. The marker-image embedding unit embeds in the watermarked image a plurality of marker images used for identifying the plurality of embedding areas.

BRIEF DESCRIPTION OF THE DRAWINGS

Exemplary embodiments of the invention will be described in detail based on the following figures, wherein.

DETAILED DESCRIPTION

Figure 1:
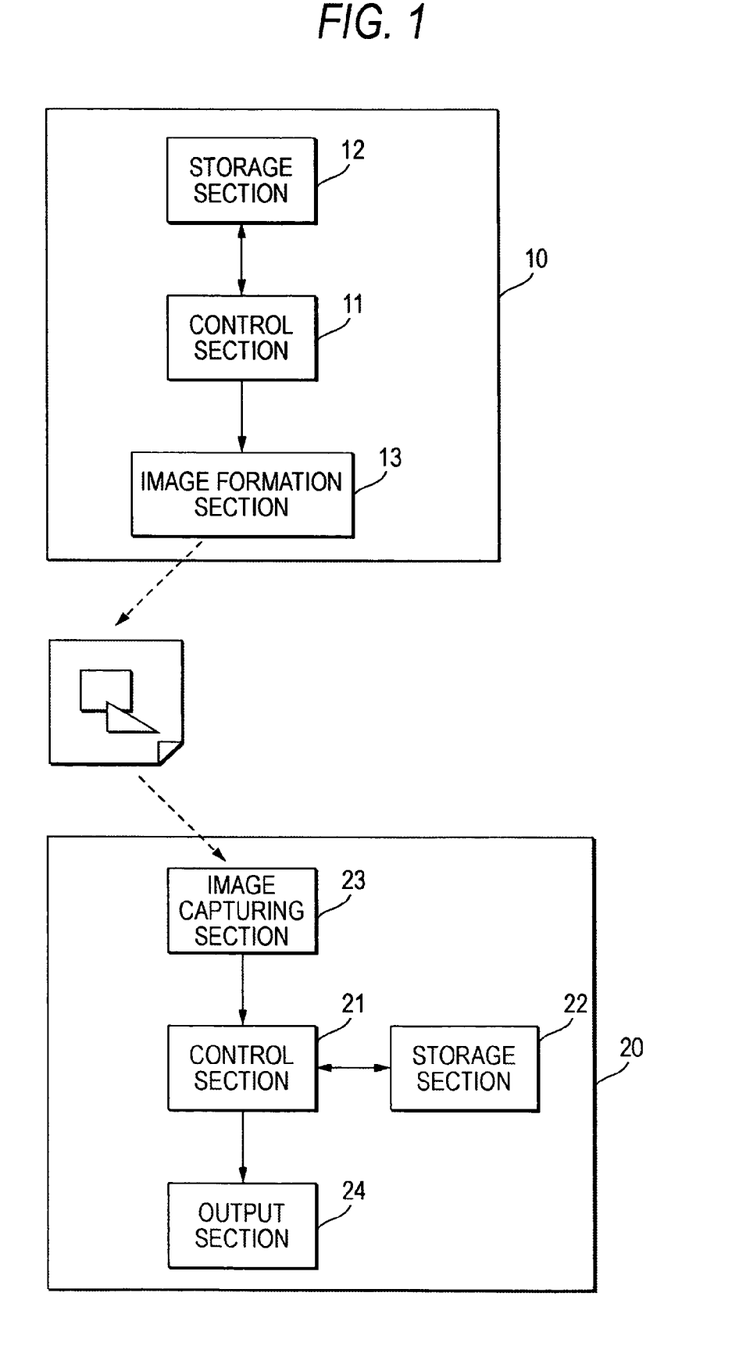
FIG. 1 is a block diagram to show the schematic configurations of a watermarked image generation apparatus and a watermarked image analysis apparatus according to an exemplary embodiment of the invention.

Referring now to the accompanying drawings, exemplary embodiments of the invention will be described. A watermarked image generation apparatus 10 according to one exemplary embodiment of the invention includes a control section 11, a storage section 12 and an image formation section 13 as shown in FIG. 1.

A watermarked image analysis apparatus 20 reads a medium on which a watermarked image is formed by the watermarked image generation apparatus 10. The watermarked image analysis apparatus 20 includes a control section 21, a storage section 22, an image capturing section 23 and an output section 24.

The control section 11 of the watermarked image generation apparatus 10 is a CPU, and operates in accordance with a program stored in the storage section 12. In the exemplary embodiment, the control section 11 performs processing of embedding target data in an original image to generate a watermarked image. An example of the processing executed by the control section 11 will be described later in detail.

The storage section 12 is a computer-readable storage medium that stores programs executed by the control section 11. The storage section 12 may include at least either of a memory device such as RAM and ROM, and a disk device. The storage section 12 also operates as work memory of the control section 11. Further, in the exemplary embodiment, the storage section 12 stores image data of an original image to which the control section 11 applies processing and target data to be embedded.

The image formation section 13, which may be a printer, forms a watermarked image on a medium such as a sheet of paper, based on image data input from the control section 11.

The control section 21 of the watermarked image analysis apparatus 20 may be a CPU, and operates in accordance with a program stored in the storage section 22. In the exemplary embodiment, the control section 21 performs processing of analyzing the captured image provided by the image capturing section 23 that captures a watermarked image, to extract the target data embedded in the watermarked image. An example of the processing executed by the control section 21 will be described later in detail.

The storage section 22 is a computer-readable storage medium that stores programs executed by the control section 21. The storage section 22 includes at least either of a memory device such as RAM and ROM, and a disk device. The storage section 22 also operates as work memory of the control section 21.

The image capturing section 23, which may be a CCD camera, captures an image formed on a medium to be captured, and outputs to the control section 22 image data of the captured image.

The output section 24 includes at least either of (i) a display for displaying the target data output by the control section 21 and analyzing the captured image and (ii) a printer for printing out the target data.

Next, an example of processing, in which the control section 11 of the watermarked image generation apparatus 10 operates in accordance with the program stored in the storage section 12 to generate a watermarked image, will be described based on a flowchart of FIG. 2.

The control section 11 first reads the original image stored in the storage section 12 and acquires the original image (S1). Further, the control section 11 reads the target data to be embedded in the original image, stored in the storage section 12 and acquires the target data (S2).

Next, the control section 11 performs target-data embedding processing of embedding the target data acquired at S2 in respective embedding areas in the original image acquired at S1 (S3). Accordingly, the control section 11 generates a watermarked image. As a method for embedding the target data, any of various methods known as electronic watermarking technology may be used.

The embedding areas are contained in the original image and have a smaller size than the original image. A position and a size of each embedding area in the original image are determined by a predetermined method. The control section 11 may determine the position and the size of each embedding area in the original image based on size and shape of the original image. The control section 11 may determine the size of each embedding area based on the data size of the target data and may determine the position of each embedding area in the original image based on the determined size.

The control section 11 arranges plural embedding areas in the original image and embeds the target data in the respective plural embedding areas. In this case, the control section 11 may determined intervals between the embedding areas based on the size of a marker image or based on the size of the original image and the size of each embedding area.

Subsequently, in predetermined areas (marker areas) in the surroundings of the plural embedding areas in which the target data is embedded at S3, the control section 11 embeds plural marker images used for identifying the plural embedding areas (S4). Accordingly, the watermarked image analysis apparatus 20, which captures the watermarked image generated by the watermarked image generation apparatus 10, can detect the marker images from the captured image, to thereby acquire a position and a size of each embedding area contained in the watermarked image and to identify each embedding area by performing simple processing. The marker image is a pattern image having a predetermined shape. The marker images are embedded in the watermarked image in a form that human's eye hardly recognize, by a method similar to that at S3 or a different method.

Further, at least one of the marker images embedded at S4 may be used in identifying at least some of the embedding areas in which the target data is embedded at S3.

Figure 3:
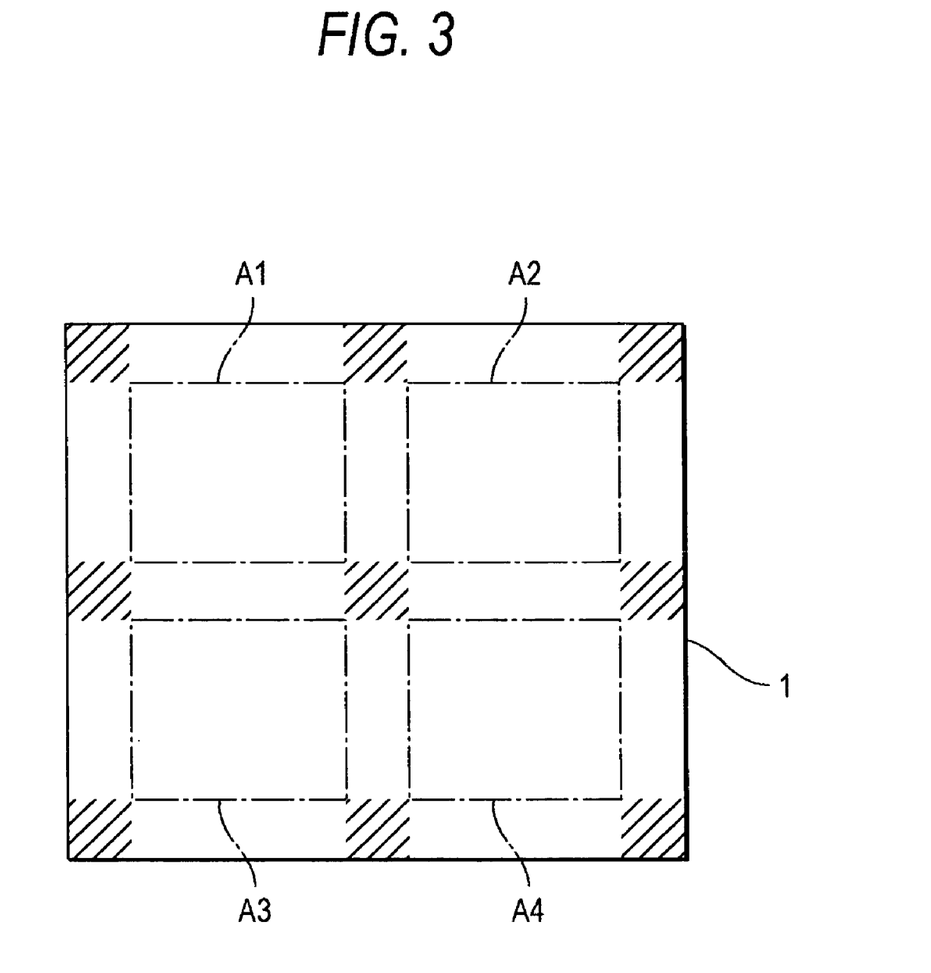
FIG. 3 is a schematic representation to show an example of a watermarked image generated by the watermarked image generation apparatus according to the exemplary embodiment of the invention.

FIG. 3 is a drawing to show an example of an image provided by embedding target data repeatedly in an original image I. In FIG. 3, details of the original image are not shown. In the example in FIG. 3, the original image I contains four embedding areas A1, A2, A3, and A4 and the same target data is embedded in the four embedding areas A1 to A4. Nine marker areas (hatched in FIG. 3) are placed in the surroundings of the embedding areas A1 to A4. The five of the nine marker images embedded in the marker areas except the four marker images placed in the four corners of the original image I are used for identifying plural embedding areas.

Thus, the target data is embedded repeatedly in the plural embedding areas. Further, the plural images used for identifying the plural embedding areas are embedded. Thereby, when a user later captures the watermarked image, if he/she only captures a part of the watermarked image so as to have a certain size or more, the target data can be extracted regardless of which portion is captured.

On the other hand, however, the target data is embedded in the original image in an optically identifiable form because the target data needs to be extracted from the captured image. Thus, if the target data is embedded repeatedly in the watermarked image, the visual effect of the original image is impaired and the appearance of the original image may be adversely affected.

Then, for the watermarked image generated at S3 and S4, the control section 11 performs density adjustment processing of changing the density of a non-embedding area, which is other than the embedding areas in the watermarked image, by a predetermined method (S5).

Several examples of the density adjustment processing will be described. As a first example, the control section 11 may embed dummy data in the non-embedding area, to thereby change the density of the non-embedding area. For example, the dummy data may be a random number generated using a predetermined pseudo-random number generation algorithm, or may be a predetermined constant value previously stored in the storage section 12. The dummy data is embedded using the same method as that of embedding the target data at S3.

According to the method in the first example, the control section 11 may generate a watermarked image with some data embedded in the whole of the original image.

As a second example, the control section 11 may acquire the change amount of the density of the embedding areas between before and after the target-data embedding processing at S3, and change the density of the non-embedding area based on the acquired density change amount.

For example, the control section 11 acquires the difference between an average density of the embedding areas before the target-data embedding processing and that after the target-data embedding processing, as the density change amount. As a specific example, the control section 11 first calculates a sum of the density values of pixels contained in the embedding areas for the original image before embedding, and divides the sum of density values by the number of pixels to calculate the average density value before embedding (pre-embed average density value). Likewise, the control section 11 calculates the average value of the density values of the pixels contained in the embedding areas for the image provided after the target data is embedded at S3 (post-embed average density value). The control section 11 subtracts the pre-embed average density value from the post-embed average density value to obtain the average density difference (density difference value).

Further, the control section 11 changes the density of the non-embedding area based on the density change amount of the obtained density difference value. For example, the control section 11 changes the density by adding the density difference value to the density values of the pixels in the non-embedding area.

Subsequently, the control section 11 outputs to the image formation section 13 the watermarked image subjected to the density adjustment processing at S5 (S6) and terminates the processing.

The image formation section 13 forms the watermarked image on a medium such as a sheet of paper based on the image data of the watermarked image input from the control section 11. Accordingly, a medium formed with the watermarked image is generated wherein the target data to be embedded is embedded in the embedding areas in the original image and the density of the non-embedding area differs from the density of the area corresponding to the non-embedding area of the original image.

Next, an example of processing in which the control section 21 of the watermarked image analysis apparatus 20 operates in accordance with the program stored in the storage section 22 to analyze a watermarked image and extract target data will be discussed based on a flowchart of FIG. 4. It is assumed that the watermarked image to which the processing is applied is generated by the watermarked image generation apparatus 10 embedding the target data repeatedly in a plurality of embedding areas at S3 described above.

First, the user captures at least a part of a medium formed with the watermarked image generated by the watermarked image generation apparatus 10, by the image capturing section 23 of the watermarked image analysis apparatus 20 to acquire a captured image. Accordingly, the control section 21 acquires the image data of the captured image input from the image capturing section 23 (S11).

Next, the control section 21 analyzes the captured image acquired at S11 and identifies each embedding area contained in the captured image as an "identified embedding area" (S12). Since the watermarked image generated by embedding the target data repeatedly is captured, the captured image may contain plural embedding areas. The control section 21 identifies such plural embedding areas contained in the captured image. The identified embedding area, which is identified by the control section 21, is not necessarily limited to the entire embedding area having the same size as the whole of the embedding area in which the target data is embedded. The identified embedding area may be a "partial embedding area", which is a part of the embedding area.

As a specific example, the control section 21 detects a marker image embedded in the watermarked image and identifies the identified embedding area based on a position of the detected marker image. The processing of detecting the marker image may be performed by general pattern recognition method.

The captured image acquired at S11 may be an image captured in a state where the watermarked image formed on the medium has an inclination relative to the line of sight of the camera of the image capturing section 23 (non-vertical state). In this case, the shapes of each embedding area and each marker image in the captured image are distorted as compared with those in the watermarked image and thus the embedding area cannot be defined. Then, for example, the control section 21 detects a marker image in the captured image and estimates the inclination of the image based on the position, the shape, etc., of the detected marker image. Further, the control section 21 executes geometric conversion so that the captured image becomes an image captured from the front based on the estimated inclination. The later processing is performed for the post-conversion captured image provided by executing the geometric conversion, whereby the target data can be extracted even from the image captured in an inclination state. A method disclosed in JP 2005-26797 A may be used as the parameter estimation method of the geometric conversion. The entire disclosure of JP 2005-26797 A is incorporated herein by reference in its entirety.

Next, the control section 21 determines whether or not the identified embedding areas, which are identified at S12, contain an entire embedding area (S13). For example, the control section 21 can determine whether the identified embedding area is an entire embedding area or a partial embedding area, based on at least either of (i) information as to whether or not the identified embedding area touches the outer margin of the captured image and (ii) information on the size and the shape of the identified embedding area.

If the control section 21 determines at S13 that the identified embedding areas contain an entire embedding area, the control section 21 executes extraction processing of analyzing the image data in the entire embedding area and extracting target data (S14). The extraction processing is processing of extracting the embedded target data from the watermarked image in which the target data is embedded according to the electronic watermarking technology and can be accomplished by a method according to the electronic watermarking technology used by the watermarked image generation apparatus 10 to generate the watermarked image.

If the captured image contains plural entire embedding areas, the control section 21 may execute the extraction processing for each of the entire embedding areas. If the extracted target data (extraction data) in one embedding area differs from that in another embedding area, the valid target data is determined as follows: If different bits are contained at the same positions of the extraction data pieces, the common bit in a largest number of the extraction data pieces is adopted as the valid target data bit. The target data is thus determined from the plural pieces of extraction data provided by executing the extraction processing for the plural identified embedding areas, so that the control section 21 can decrease the error occurrence frequency in the extraction processing.

On the other hand, although it is determined at S13 that the identified embedding areas do not contain any entire embedding area, if the shape and the size of each embedding area, which the watermarked image generation apparatus 10 uses to generate a watermarked image, are predetermined, the control section 21 can extract the target data from the plural identified partial embedding areas by performing the following processing.

First, the control section 21 acquires information representing an occupation range of each partial embedding area in the entire embedding area (occupation range information) (S15). For example, the control section 21 can determine the occupation range information of each partial embedding area based on a relative position of each partial embedding area to a marker image and a size of each partial embedding area.

Figure 5A:
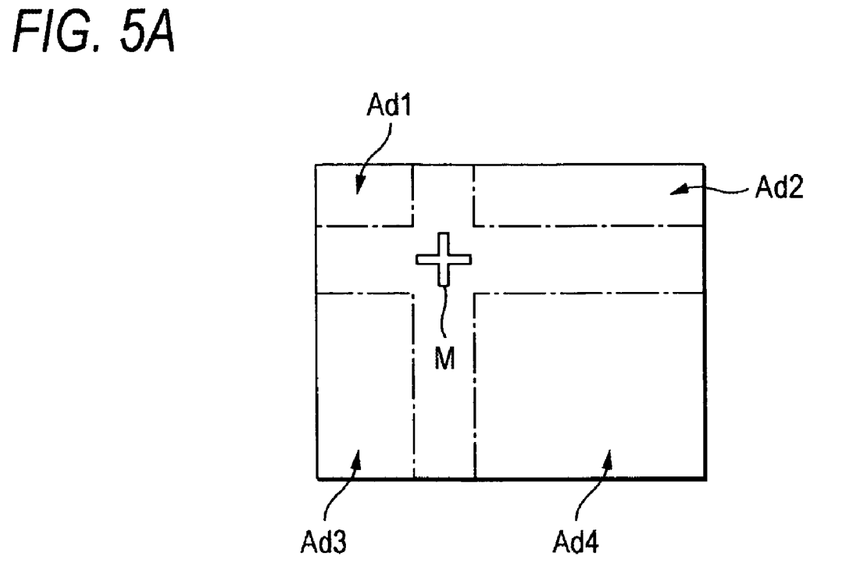
FIG. 5 is an explanatory diagram to show examples of a captured image provided by the watermarked image analysis apparatus according to the exemplary embodiment of the invention and an embedding area.

As a specific example, the case where the watermarked image analysis apparatus 20 acquires a captured image as shown in FIG. 5A will be described. The control section 21 identifies areas Ad1, Ad2, Ad3, and Ad4 as "partial embedding areas". In this case, it is seen based on the relative position of each partial embedding area to a marker image M that the area Ad1 is a lower right portion of one embedding area, that the area Ad2 is a lower left portion of another embedding area, that the area Ad3 is an upper right portion of another embedding area, and that the area Ad4 is an upper left portion of another embedding area. From the sizes of each areas Ad1 to Ad4, the occupation ranges of the corresponding partial embedding areas in the embedding area contained in the original watermarked image can be determined. Accordingly, the control section 21 can acquire the occupation range information by a method of determining the upper right and lower left coordinates of the partial embedding area in the embedding area, for example.

Next, the control section 21 selects plural analysis target areas from among the partial embedding areas based on the occupation range information of each partial embedding area acquired at S15 (S16). The analysis target area may be at least a portion of the corresponding partial embedding area.

Figure 5B:
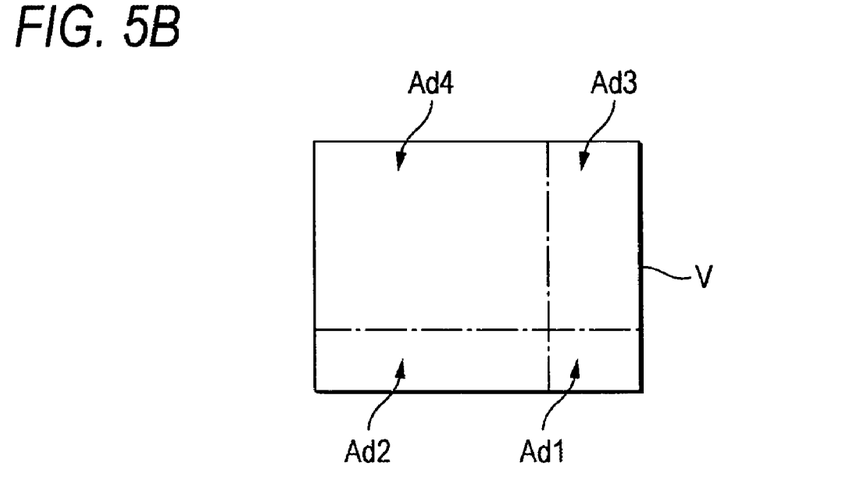

The control section 21 selects analysis target areas so that the whole of the target data can be re-generated. For example, the control section 21 selects analysis target areas so that if each of the analysis target areas is placed at position corresponding to the occupation range in the embedding area for a virtual area of the same shape and size as those of the embedding area, at least any one of the analysis target areas occupies all the range of the virtual area. Accordingly, the data embedded in each analysis target area is extracted and is re-generated, whereby the whole of the target data embedded in the embedding area can be extracted. In the example shown in FIG. 5A, the areas Ad1, Ad2, Ad3, and Ad4 can be placed so as to occupy all the range of a virtual area V as shown in FIG. 5B and thus the four areas are selected as the analysis target areas.

In the example, the control section 21 selects the analysis target areas so that if the selected areas are placed in the virtual area, they do not overlap. However, the control section 21 may select the analysis target areas so that the selected areas overlap.

Subsequently, the control section 21 executes extraction processing of extracting the data extracted in each of the analysis target areas selected at S16 (S17). The data extracted in each of the analysis target areas is "partial target data," which is a part of the target data. The extraction processing at S17 can be accomplished by a similar method to that of the extraction processing at S14. Which portion the partial target data occupies in the whole target data can be determined based on the occupation range information of the analysis target area acquired at S15.

If the analysis target areas are selected at S16 so that if the selected areas are placed in the virtual area, the selected areas overlap as described above, plural pieces of partial target data can be extracted at S17 for the portion in the target data corresponding to the overlap. In this case, valid partial target data may be selected from plural pieces of partial target data extracted as with the example of performing the extraction processing for plural entire embedding areas described above.

Further, the control section 21 combines the plural pieces of partial target data obtained at S17 to re-generate the target data (S18). Specifically, for example, the control section 21 can divide the partial target data in continuous data units based on the information indicating which portion the partial target data occupies in the whole target data, determined based on the occupation range information and can arrange the division data units in order, thereby re-generating the target data.

The control section 21 acquiring the target data at S14 or S18 outputs the target data to the output section 24 (S19). Accordingly, the user can acquire the target data embedded in the watermarked image.

In the description given above, the non-embedding area is all area except the embedding areas contained in the original image, but may be defined as an area except the embedding areas contained in the original image and satisfying a predetermined condition. For example, if a marker image is embedded in a marker area at S4, the control section 11 may exclude the marker area from the non-embedding area. An area made up of white pixels (for example, pixels each with the density value equal to or less than a predetermined threshold value) forming the background of the original image may be excluded from the non-embedding area. An area of predetermined processing target areas contained in the original image except embedding areas may be defined as a non-embedding area.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

FIG. 1
11 CONTROL SECTION
12 STORAGE SECTION
13 IMAGE FORMATION SECTION
21 CONTROL SECTION
22 STORAGE SECTION
23 IMAGE CAPTURING SECTION
24 OUTPUT SECTION

Figure 2:
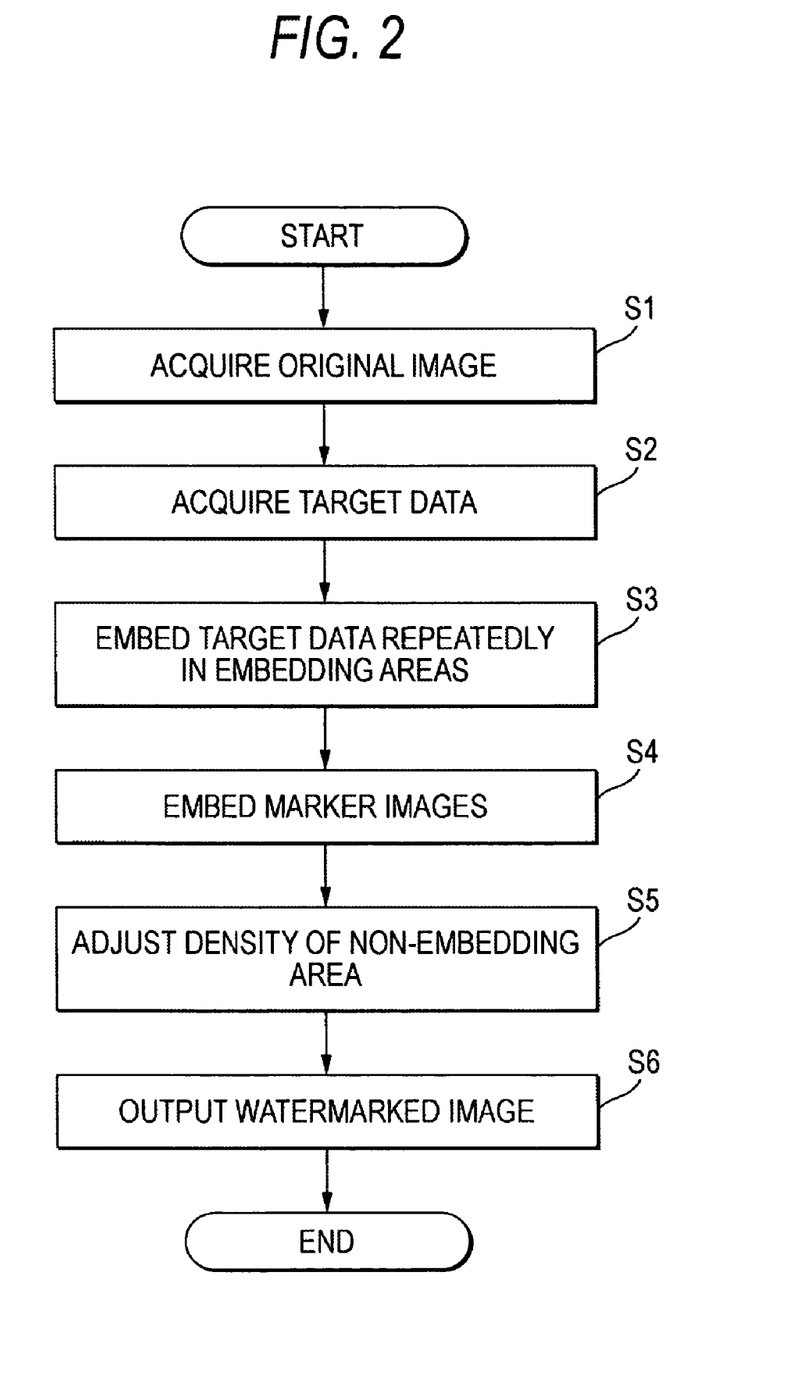
FIG. 2 is a flowchart to show an example of processing executed by the watermarked image generation apparatus according to the exemplary embodiment of the invention.

FIG. 2
S1 ACQUIRE ORIGINAL IMAGE
S2 ACQUIRE TARGET DATA
S3 EMBED TARGET DATA REPEATEDLY IN EMBEDDING AREAS
S4 EMBED MARKER IMAGES
S5 ADJUST DENSITY OF NON-EMBEDDING AREA
S6 OUTPUT WATERMARKED IMAGE

Figure 4:
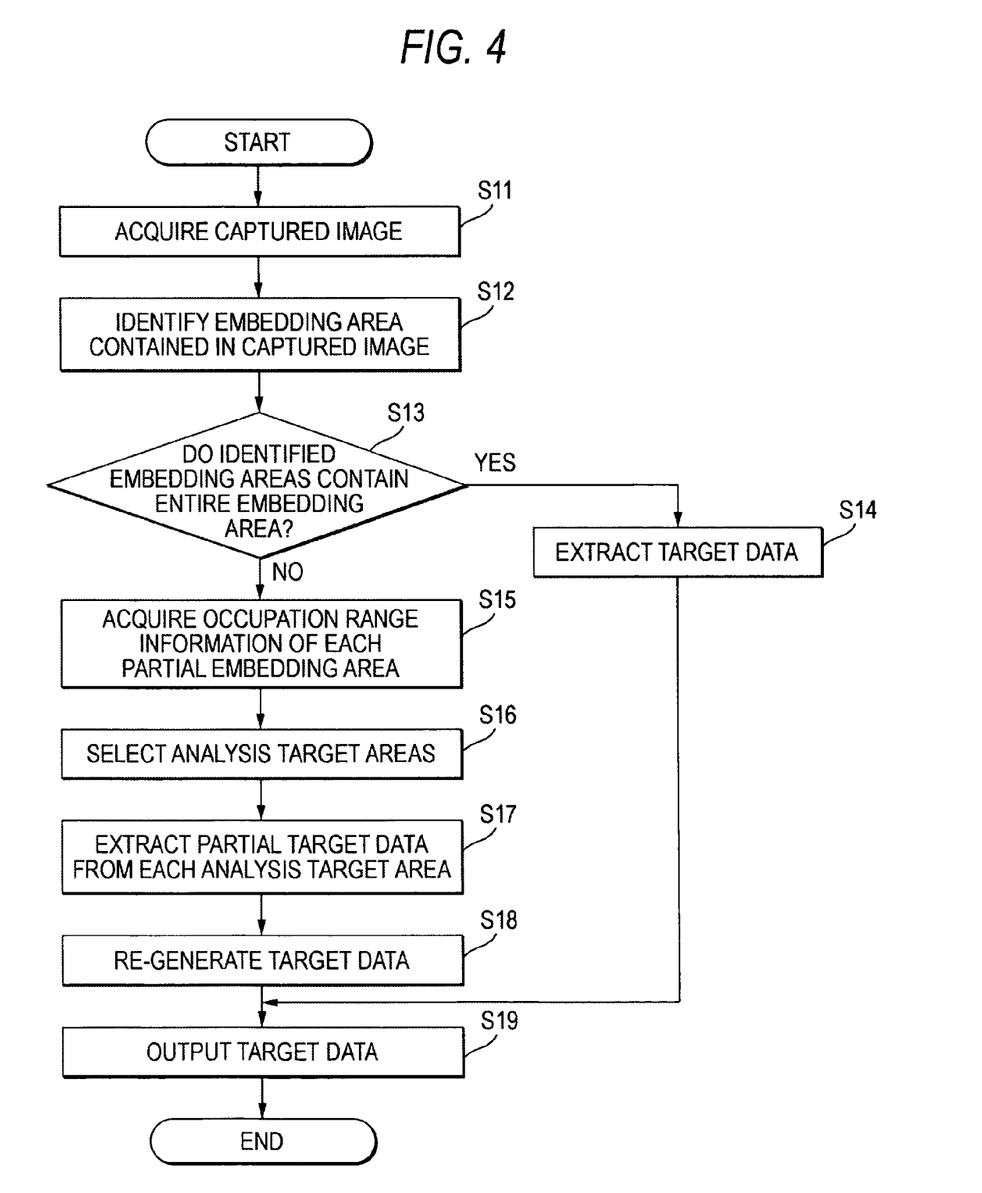
FIG. 4 is a flowchart to show an example of processing executed by the watermarked image analysis apparatus according to the exemplary embodiment of the invention.

FIG. 4
S11 ACQUIRE CAPTURED IMAGE
S12 IDENTIFY EMBEDDING AREA CONTAINED IN CAPTURED IMAGE
S13 DO IDENTIFIED EMBEDDING AREAS CONTAIN ENTIRE EMBEDDING AREA?
S14 EXTRACT TARGET DATA
S15 ACQUIRE OCCUPATION RANGE INFORMATION OF EACH PARTIAL EMBEDDING AREA
S16 SELECT ANALYSIS TARGET AREAS
S17 EXTRACT PARTIAL TARGET DATA FROM EACH ANALYSIS TARGET AREA
S18 RE-GENERATE TARGET DATA
S19 OUTPUT TARGET DATA

What is claimed is:

1. A watermarked image generation apparatus for embedding target data in an original image to generate a watermarked image, the watermarked image generation apparatus comprising:
  an acquiring unit that acquires a captured image provided by capturing a part of the watermarked image,
  a target-data embedding unit that embeds the target data in respective plural embedding areas contained in the original image so as to arrange a same target data in lines repeatedly, to generate the watermarked image;
  a marker-image embedding unit that embeds in the watermarked image a plurality of marked images used for identifying the plural embedding areas; and
  a density adjustment unit that changes a density of a non-embedding area, which is an area in the watermarked image other than the plural embedding areas, wherein
  the plural embedding areas are separated from each other so that no portion of each embedding area shares a common portion with another embedding area, and
  a detecting unit that detects the marked images contained in the captured image;
  an identifying unit that identifies a plurality of partial embedded areas contained in the captured image based on positions of the marked images detected by the detecting unit, each of the partial embedding areas being a portion of the embedding area;
  an extraction unit that analyzes some of the plurality of partial embedding areas, and that extracts plural pieces of partial target data, each of pieces of partial target data being a portion of the target data; and
  a target data re-generating unit that (i) determines in which portion each of partial target data covers in the target data based on relative positions between the marked images and partial embedding areas corresponding to the partial target data, (ii) combines the extracted pieces of partial target data according to a result of the determination, and (iii) re-generates the target data.

2. The apparatus according to claim 1, wherein the density adjustment unit embeds dummy data in the non-embedding area to change the density of the non-embedding area.

3. The apparatus according to claim 1, wherein:
  the density adjustment unit acquires a change amount of a density of the plural embedding areas between before and after the target-data embedding unit embeds the target data in the plural embedding areas, and the density adjustment unit changes the density of the non-embedding area based on the acquired change amount of the density of the plural embedding areas.

4. The apparatus according to claim 1, further comprising:
a density adjustment unit that changes a density of a non-embedding area, which is an area in the watermarked image other than the plural embedding areas.

5. The apparatus according to claim 4, wherein the density adjustment unit embeds dummy data in the non-embedding area to change the density of the non-embedding area.

6. The apparatus according to claim 4, wherein:
the density adjustment unit acquires a change amount of a density of the plural embedding areas between before and after the target-data embedding unit embeds the target data in the plural embedding areas, and the density adjustment unit changes the density of the non-embedding area based on the acquired change amount of the density of the plural embedding areas.

7. A watermarked image analysis apparatus for extracting target data from a watermarked image, the watermarked image analysis apparatus comprising:
an image capturing unit that captures at least a part of the watermarked image to provide a captured image, the watermarked image having common target data embedded in respective plural embedding areas contained in an original image so as to arrange a same target data in lines repeatedly; and having marked images embedded in respective plural embedding areas for using to identify the respective plural embedding areas;

a detecting unit that detects the marked images contained in the captured image;

an identifying unit that identifies a plurality of partial embedding areas contained in the captured image, based on positions of the marked images detected by the detecting unit, each of the partial embedding areas being a portion of the embedding area;

an extraction unit that analyzes some of the plurality of partial embedding areas, and unit that extracts plural pieces of partial target data, each of the pieces of partial target data being a portion of the target data; and a target data re-generating unit that (i) determines in which portion each of partial target data covers in the target data based on relative positions between the marked images and partial embedding areas corresponding to the partial target data, (ii) combines the extracted pieces of partial target data according to a result of the determination, and (iii) re-generates the target data.

8. A watermarked image generation method to embed target data in an original image to generate a watermarked image, the method comprising:
acquiring a captured image provided by capturing a part of the watermarked image, embedding the target data in respective plural embedding areas contained in the original image so as to arrange a same target data in lines repeatedly, to generate the watermarked image;

embedding a plurality of marked images used for identifying the plural embedding areas in the watermarked image; and changing a density of a non-embedding area, which is an area in the watermarked image other than the plural embedding areas, wherein the embedding of the target data and the embedding of the plurality of marker images are performed by a processor, the plural embedding areas are separated from each other so that no portion of each embedding area shares a common portion with another embedding area, and detecting the marked images contained in the captured image;

identifying a plurality of partial embedded areas contained in the captured image based on positions of the detected marked images, each of the partial embedding areas being a portion of the embedding area;

analyzing some of the plurality of partial embedding areas, and extracting plural pieces of partial target data, each of pieces of partial target data being a portion of the target data; and Re-generating a target data comprising the steps of:
(i) determining in which portion each of partial target data covers in the target data based on relative positions between the marked images and partial embedding areas corresponding to the partial target data, and
(ii) combining the extracted pieces of partial target data according to a result of the determination, and
(ii) combining the extracted pieces of partial target data according to a result of the determination.

9. A computer readable medium storing a program causing a computer to execute a process for embedding target data in an original image to generate a watermarked image, the process comprising:
acquiring a captured image provided by capturing a part of the watermarked image, embedding the target data in respective plural embedding areas contained in the original image so as to arrange a same target data in lines repeatedly, to generate the watermarked image;

embedding in the watermarked image a plurality of marked images used for identifying the plural embedding areas; and changing a density of a non-embedding area, which is an area in the watermarked image other than the plural embedding areas, wherein the plural embedding areas are separated from each other so that no portion of each embedding area shares a common portion with another embedding area, and detecting the marked images contained in the captured image;

identifying a plurality of partial embedded areas contained in the captured image based on positions of the detected marked images, each of the partial embedding areas being a portion of the embedding area;

analyzing some of the plurality of partial embedding areas, and extracting plural pieces of partial target data, each of pieces of partial target data being a portion of the target data; and Re-generating a target data comprising:
(i) determining in which portion each of partial target data covers in the target data based on relative positions between the marked images and partial embedding areas corresponding to the partial target data, and
(ii) combining the extracted pieces of partial target data according to a result of the determination.

* * * * *